S. LOE.
REGISTER READING SCALE FOR VOTING MACHINES.
APPLICATION FILED MAY 24, 1917.
1,304,581.
Patented May 27, 1919.
2 SHEETS—SHEET 2.
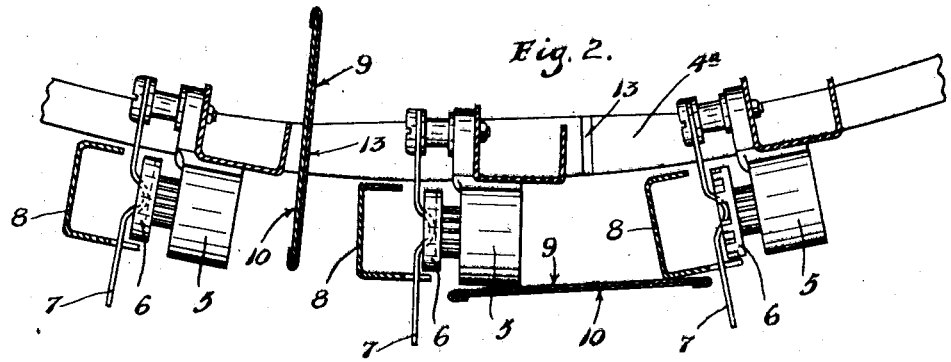
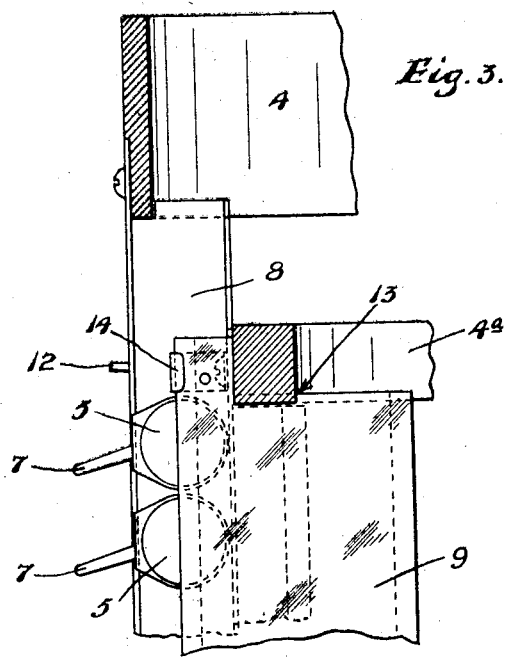
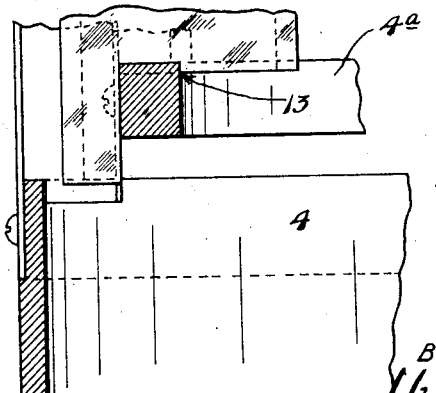
WITNESSES.
H. L. Opsahl.
A. H. Opsahl
INVENTOR.
SYVER LOE
BY HIS ATTORNEYS.

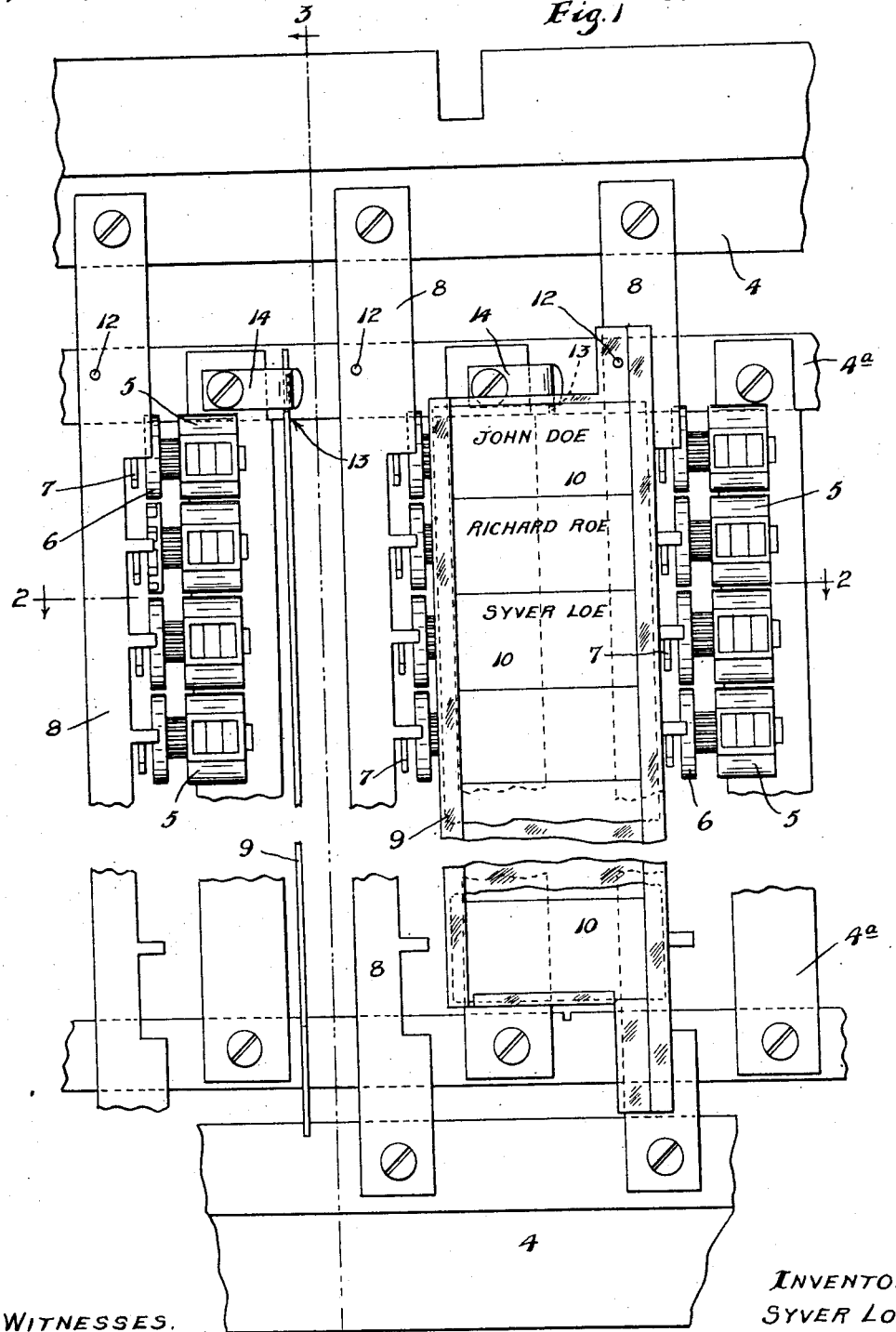

UNITED STATES PATENT OFFICE.

SYVER LOE, OF MINNEAPOLIS, MINNESOTA, ASSIGNOR, BY DIRECT AND MESNE ASSIGNMENTS, TO LOE MULTIPLEX VOTING MACHINE COMPANY, OF MINNEAPOLIS, MINNESOTA, A CORPORATION OF MINNESOTA.

REGISTER-READING SCALE FOR VOTING-MACHINES.

1,304,581.   Specification of Letters Patent.   Patented May 27, 1919.

Application filed May 24, 1917. Serial No. 170,725.

*To all whom it may concern:*

Be it known that I, SYVER LOE, a citizen of the United States, residing at Minneapolis, in the county of Hennepin and State of Minnesota, have invented certain new and useful Improvements in Register-Reading Scales for Voting-Machines; and I do hereby declare the following to be a full, clear, and exact description of the invention, such as will enable others skilled in the art to which it appertains to make and use the same.

My invention has for its object to provide an improved register reading scale for voting machines of the type wherein registers or tallies are arranged in rows or columns and are disassociated from the register actuators and ballot strips or tickets, at a time when the readings must be taken from the said tallies. Particularly, the invention has for its object to provide such a reading scale for use in connection with a multiplex voting machine of the character disclosed and claimed in my prior Patent No. 1158518 granted of date, November 2nd, 1915.

In multiplex voting machines of this character, there is a multiplicity of sets of register actuators and a common relatively movable set of vote registers or tallies. After the poles have been closed, it is necessary to take off the readings of the registers given to each candidate to properly credit the number of votes. My improved reading scale makes it an easy matter to quickly read off the names and office of the candidates represented by the different registers, as soon as the number of votes are cast therefor.

In the accompanying drawings which illustrate the invention, like characters indicate like parts throughout the several views.

Referring to the drawings,

Figure 1 is a view in front elevation with some parts broken away, showing the rotary register support and several of the columns of registers or tallies;

Fig. 2 is a horizontal section on the line 2—2 of Fig. 1, and

Fig. 3 is a vertical section taken approximately on the line 3—3 of Fig. 1.

The register supporting frame is indicated, as an entirety, by the numeral 4 and the vote registers or tallies are indicated, as entireties, by the numeral 5. The cases of these registers are secured to a supplemental portion 4ª of the register support in vertical rows or columns and the unit members of the said registers have escapement wheels 6 subject to escapement levers 7 that are engaged by lugs of upright frame bars 8 and operated in a manner fully disclosed in my said prior patent above identified.

In each column of registers, there is provided a reading scale 9, preferably in the form of a light sheet metal plate with flanged edges arranged to hold cards 10. The parts 10 correspond in number and position to the registers 5, and each is marked with the name of the candidate and the office assigned to the horizontally alined registers.

When the reading is to be taken from the registers, the proper reading scale 9 is positioned, substantially, as shown at the right in Figs. 1 and 2; and to insure the proper vertical positioning of the said reading scale, it is provided at its upper end with a perforation adapted to be inserted over an alining pin 12 provided on the corresponding frame bar 8.

When the reading scale is out of use, it is preferably hung out of the way, as shown in the left in Figs. 1 and 2, and when thus positioned, it will be securely, but detachably held, preferably by the following means:

The upper and lower edges of the main body portion of the scale 9 is slipped into grooves 13 formed in horizontally disposed upper and lower segmental bars of the supplemental frame 4ª, and a reduced upper end of said scale is clamped by the bent end of the retaining spring 14 which is attached to the adjacent register supporting bar of the supplemental frame 4ª.

These improved reading scales, of which there should be one for each column of registers, are always kept in their proper relative positions, but out of the way, and may be quickly and accurately applied for the purpose of taking off the readings of the registers after the close of an election.

What I claim is:

In a voting machine, the combination with a movable register support having a plurality of columns of vote registers, of reading scales marked to identify the candidates and office to which the respective registers are appropriated, the said support having means for detachably holding said scales in inoperating positions, and for detachably holding the same in operative positions properly alined with the coöperating registers.

In testimony whereof I affix my signature in presence of two witnesses.

SYVER LOE.

Witnesses:
CLARA DEMAREST,
BERNICE G. WHEELER.

Copies of this patent may be obtained for five cents each, by addressing the "Commissioner of Patents, Washington, D. C."